United States Patent [19]

Aoki

[11] 4,349,761
[45] Sep. 14, 1982

[54] FLAT TYPE CORELESS ROTARY ELECTRIC MACHINE

[75] Inventor: Kanemasa Aoki, Yokohama, Japan

[73] Assignees: Canon Kabushiki Kaisha; Canon Seiki Kabushiki Kaisha, both of Tokyo, Japan

[21] Appl. No.: 131,498

[22] Filed: Mar. 18, 1980

[30] Foreign Application Priority Data

Mar. 20, 1979 [JP] Japan ................................. 54-32630

[51] Int. Cl.³ .............................................. H02K 1/22
[52] U.S. Cl. ..................................... 310/266; 310/154
[58] Field of Search ................. 310/266, 40 MM, 154, 310/239, 90, 157, 67, 43, 233, 234, 248

[56] References Cited

U.S. PATENT DOCUMENTS

| | | | |
|---|---|---|---|
| 3,308,319 | 3/1967 | Faulhaber | 310/154 |
| 3,467,847 | 9/1969 | Faulhaber | 310/266 |
| 4,087,713 | 5/1978 | Binder | 310/266 |
| 4,136,294 | 1/1979 | Aubert | 310/266 |
| 4,210,832 | 7/1980 | Ascoli | 310/266 |

FOREIGN PATENT DOCUMENTS

| | | | |
|---|---|---|---|
| 2608889 | 10/1977 | Fed. Rep. of Germany | 310/266 |
| 2635297 | 10/1977 | Fed. Rep. of Germany | 310/266 |
| 2126199 | 5/1979 | Fed. Rep. of Germany | 310/266 |
| 49-22361 | of 1974 | Japan | 310/266 |
| 54-119604 | 9/1979 | Japan | 310/266 |
| 181345 | 2/1936 | Switzerland | 310/266 |

*Primary Examiner*—R. Skudy
*Attorney, Agent, or Firm*—Fitzpatrick, Cella, Harper & Scinto

[57] ABSTRACT

The present invention relates to a rotary electric machine of the type in which a coreless rotary coil having an end connection only at its one side end is mounted on a shaft rotatably within the magnetic field of a stator field magnet and is directed to a novel design for making such type of rotary electric machine flattened in form. According to the present invention a flat shaped coreless electric machine is provided by arranging the commutator of the rotary machine within an open side part opposed to the end connection of the coreless rotary coil.

4 Claims, 7 Drawing Figures

$S_o = D/SEGMENT$
$S_o' = S_o \times \sin\theta$

FLAT TYPE CORELESS ROTARY ELECTRIC MACHINE

BACKGROUND OF THE INVENTION

1. Field of the Invention

The present invention relates to a coreless rotary electric machine.

2. Description of the Prior Art

The above-mentioned type of rotary electric machine, that is, a rotary electric machine having such coreless rotary coil which has an end connection only at its one side and which is mounted on a shaft rotatably within the magnetic field of a stator field magnet is known, for example, by Japanese Patent Application Publication No. 22,361/1974 and DOS 2,126,199.

In the art of acoustic apparatus and device such as tape recorder and video tape recorder nowadays there is an increasing desire for miniaturization and higher performance. To satisfy the desire it is essential to reduce the size and weight of the rotary electric machine used in the acoustic apparatus while further improving the capacity and performance of the rotary machine. It is evident that the above-mentioned type of coreless rotary electric machine is most suitable for this purpose.

However, miniaturization and improvement of performance of the conventional coreless rotary electric machine can not be attained only by reducing the size and improving the performance of individual component parts of the machine. It is absolutely necessary to change the structure and arrangement of rotary coil and commutator in the coreless rotary electric machine employing a new conception of design. Considering the mounting place and space volume available for a rotary electric machine in an acoustic apparatus as mentioned above, it is preferable to use in such acoustic apparatus a flat type rotary electric machine. However, designing of a rotary electric machine having a flattened form involves many limitations, in particular for the conventional arrangement of coil, magnet, yoke, brush, commutator etc. If the well-established arrangement of conventional rotary electric machine is changed for the purpose of flattening, then the efficiency may be reduced remarkably and also reasonability in structure may be lost to some extent. In fact, all the designs hitherto proposed for attaining the purpose have been realized at the sacrifice of efficiency and structural reasonability.

SUMMARY OF THE INVENTION

Accordingly it is a general object of the present invention to provide a miniaturized coreless rotary electric machine which has a larger ratio of radial length to axial length than that of the conventional flat type of rotary electric machine.

It is more specific object of the invention to provide a coreless rotary electric machine having a flattened shape by arranging a commutator within the inner space of a coreless coil having an end connection at its one side only and making full use of such available area which never affects the efficiency of the rotary coil.

It is a further object of the invention to provide such flat type of a coreless rotary coil having an end connection at its one side only which is formed by joining together coil, commutator and conductor connecting the both into a cup using resin while disposing the commutator within the axial open part of the cup-shaped coil formed by resin.

Other and further objects, features and advantages of the invention will appear more fully from the following description taken in connection with the accompanying drawings.

BRIEF DESCRIPTION OF THE DRAWINGS

FIG. 1 shows an embodiment of coreless rotary electric machine in accordance with the invention wherein

DESCRIPTION OF THE PREFERRED EMBODIMENTS

A preferred embodiment of flat type coreless rotary electric machine in accordance with the present invention is described in detail with reference to FIGS. 1A to 1C.

Figure 1A:
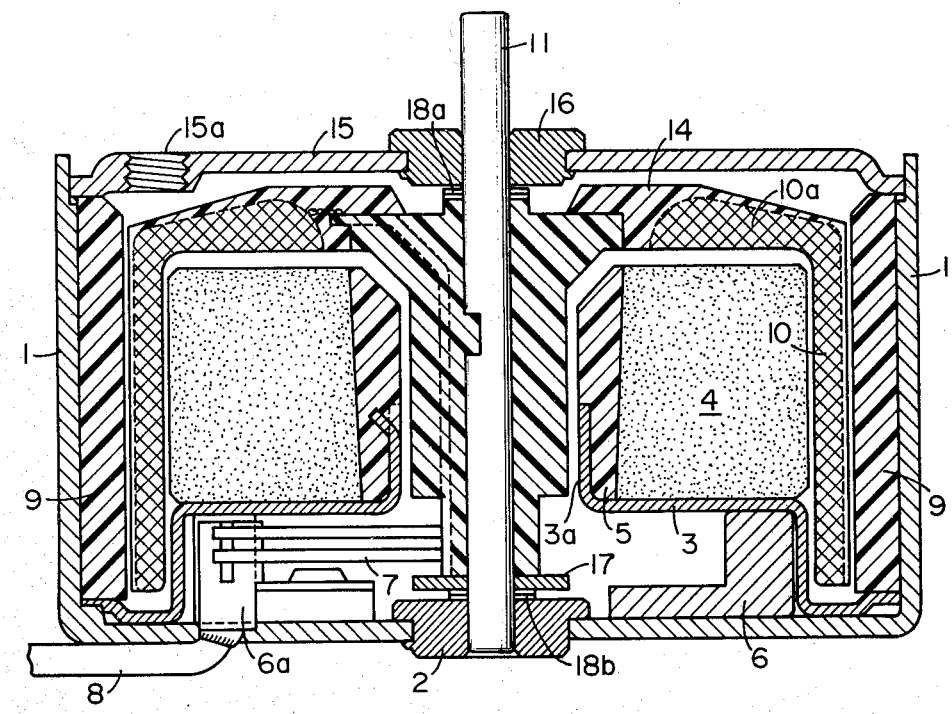
FIG. 1A is a sectional view thereof after assembled.
Figure 1B:
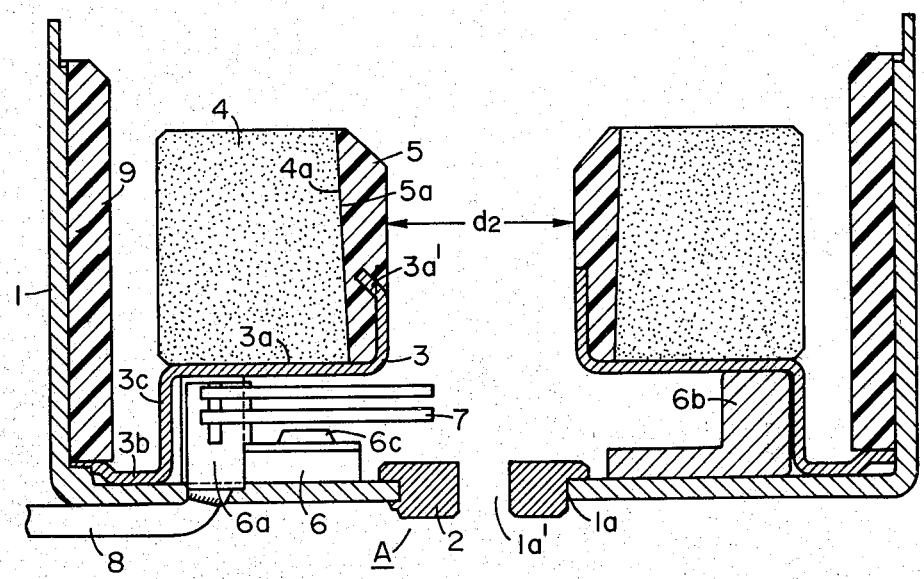
FIG. 1B is an axial sectional view of the stator unit thereof and FIG. 1C is an axial sectional view of the rotor unit thereof.

Referring to FIG. 1B showing a stator unit A, reference numeral 1 designates a motor casing which is made of soft magnetic or non-magnetic material and in a shape of cup. At the bottom side of the cup, the casing 1 has an opening 1a for mounting a bearing 1 and at the upper side it is open for allowing an insertion of a rotor unit B shown in FIG. 1C into the cup. After the stator unit A and rotor unit B have been assembled together as shown in FIG. 1, the open upper side of the cup-shaped casing 1 is closed by a cover member 15 (FIG. 1A).

Designated by 3 is a magnet holding member which is in a shape of stepped disc and supports a field magnet 4 on its inner disc portion 3a. The field magnet 4 is in a cylindrical form and is cemented to the holding member 3 by a resin material 5 injected and set on the inner circumference of the cylindrical field magnet. The inner circumferential surface 4a of magnet 4 and the corresponding surface 5a of resin block 5 contacting with the surface 4a are tapered as seen best in FIG. 1B to prevent slippage of the magnet and resin block relative to each other. Also, to assure a fixed engagement between the resin block 5 and holding member 3, the free end 3a' of the holding member is bent outwardly and embedded deeply in the resin block 5.

To support brush 7 there is provided a brush holding member 6a fixed to a holder 6 in a form of disc having a flange 6b, by a dowel 6c. A current supply lead wire 8 is guided into the motor casing 1 passing through an opening provided in the casing and the lead wire is secured to the brush holding member 6a. Designated by 9 is a cylindrical yoke made of soft magnetic material. The yoke 9 is close fitted into the motor casing 1 with no spacing being left between the inner circumference of the motor casing and the outer circumference of the cylindrical yoke.

Assembling of the stator unit A shown in FIG. 1B is carried out in the following procedure:

At first the bearing 2 is mounted on the bottom opening 1a of the cup-shaped motor casing 1. Next the brush holder 6 is positioned in the shown position and thereafter the magnet holding member 3 is inserted into the casing and placed on the holder 6. In this position, the holder 6 is contained within the inside room of the inner disc portion 3a of the magnet holding member 3 and also the flange portion 6b of the holder is pressed against the bottom of the motor casing by the disc portion 3a so that the holder 6 can be substantially fixed to the motor casing. However, in this position the holder 6 has still some freedom of rotational movement for adjustment of position of commutator. Lastly, the yoke 9 is close-fitted into the motor casing 1.

Arrangement of the rotor unit B will be described with reference to FIG. 1C.

Figure 1C:
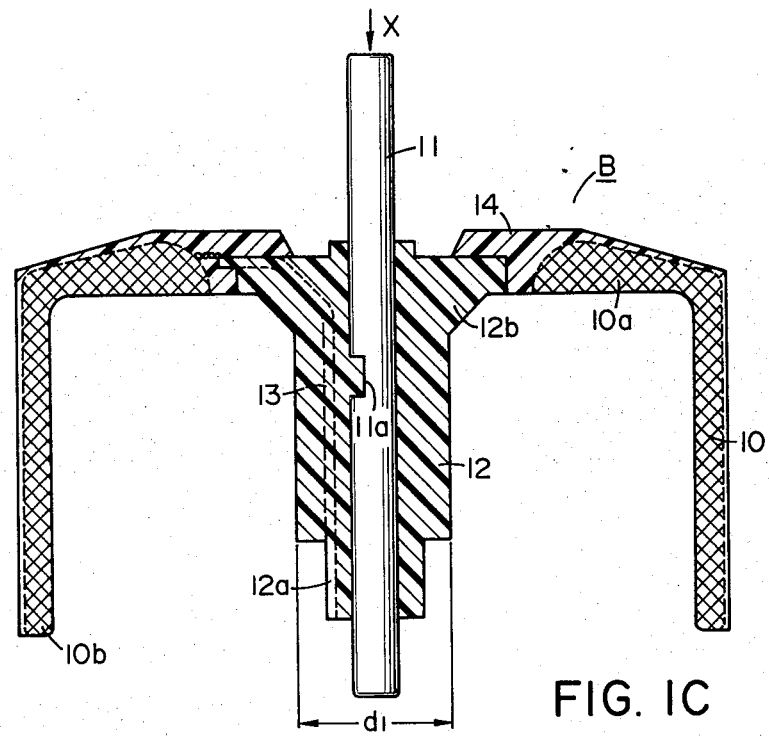

In FIG. 1C, the reference numeral 10 designates a coil having an end connection part 10a. 11 is a rotary shaft and 12 is a commutator made of resin. The commutator 12 has a flange portion 12b which constitutes an intermediate portion for connecting the end connection part 10a and the commutator 12 and also serves to hold a conductor part 13. The conductor part 13 makes an electric connection between the commutator and rotary coil. Designated by 14 is a molded resin block serving as a holding member for holding the above-mentioned members together. The rotor unit B is formed by moulding in such manner that after arranging the rotary coil 10, commutator 12 and rotary shaft 11 in a die (not shown) a mass of non-conductive resin material 14 is injected into the die and is allowed to set in situ. The resin material 14 must be so injected and solidified as to cover the end connection part 10a of the rotary coil 10 and the outward circumferential portion of the flange part 12b of commutator 12.

Diameter $d_1$ of the commutator 12 enclosing the rotary shaft 11 is so measured as to be slightly smaller than the inner diameter $d_2$ of the resin block 5 in the above described stator unit A (FIG. 1B). Since the outer diameter $d_1$ is slightly smaller than the inner diameter $d_2$ of the center bore in the resin block 5, the commutator 12 can easily be inserted into the center bore for assembly. The commutator 12 has an exposed portion 12a at the opposite side to the flange 12b facing the inner circumference of the end connection part 10a of the rotary coil 10. The exposed portion 12a of commutator and the rotary coil 10 are electrically connected through the conductor 13 embedded in the resin. To prevent any rotation of the molded resin block 14 relative to the rotary shaft 11 there is provided a cutout 11a on the shaft 11.

In assembling the rotor unit B into the stator unit A, the commutator part 12 of the unit B is inserted into the center bore of the resin block 5 of the unit A and the rotary shaft 11 is received by the bearing 2. At the same time, the rotary coil part 10 is inserted into the space between the field magnet 4 and yoke 9. After assembling, the cover member 15 shown in FIG. 1A is placed on the unit A from above, that is, from the direction indicated by arrow A to fix the assembly. In FIG. 1A, the member designated by 16 is a bearing, 17 is a washer and 18a and 18c are spacers. 15a is a bore used to mount the motor. The cover member 15 is made of soft magnetic material and forms a magnetic path through the end connection part 10a of the coil 10 to power up the output of the motor.

The motor shown in FIGS. 1A, B and C and described above includes the rotary coil 10 having the end connection part 10a. To obtain the rotary coil in a form flattened as much as possible, it is required to obtain a larger ratio of the radial length to the axial length of the coil. However, in designing such flat type of rotary coil there is a difficult problem which will be described hereinafter with reference to FIG. 2.

In FIG. 2, $\theta$ means inclination angle of effective coil in interlinkage with the magnetic flux, So is a value as given by dividing the circumferential length of rotor by the number of segments of commutator and So' is a value as given by So. sin $\theta$. The width So' determines the effective number of conductors. The problem is that the width So' is much more limited with the decrease of the inclination $\theta$.

Figure 2A:
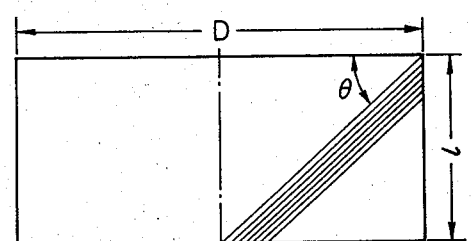
FIG. 2A is a development of the coreless coil 10 used in the embodiment shown in FIG. 1 and illustrates the relation between inclination of winding $\theta$ and motor efficiency.

As seen from FIG. 2A, So is a coil width per segment and the number of windings windable within the coil width So corresponds to the number of windings windable in one slot of an iron core. For a coil having a coil width So, the width virtually available for the coil is given by So'. Since So'=So. sin $\theta$, the effective coil width So' varies depending upon the inclination $\theta$ of the coil. On the other hand, as a matter of course, the inclination $\theta$ must be constant throughout a given coil. If the angle $\theta$ varies from winding to winding in one and single coil, then the value So' will be limited by the smallest angle among them. In this sense, the locus of a coil winding may be considered to describe a spiral line with a constant inclination on the cylindrical surface of an armature.

Use of a smaller inclination $\theta$ of winding results in a smaller winding space per segment of commutator, which in turn causes a corresponding reduction of motor efficiency. Therefore, in order to keep the efficiency at a certain constant level, the inclination $\theta$ has to be maintained at a value larger than a given limitation.

Figure 2B:
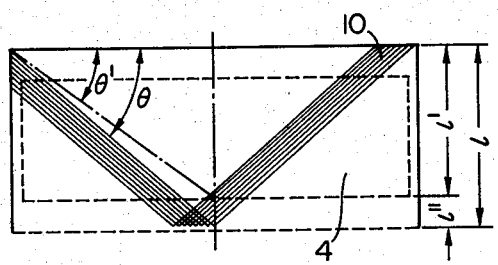
FIG. 2B illustrates the relation between the development and flattened form.
Figure 2C:
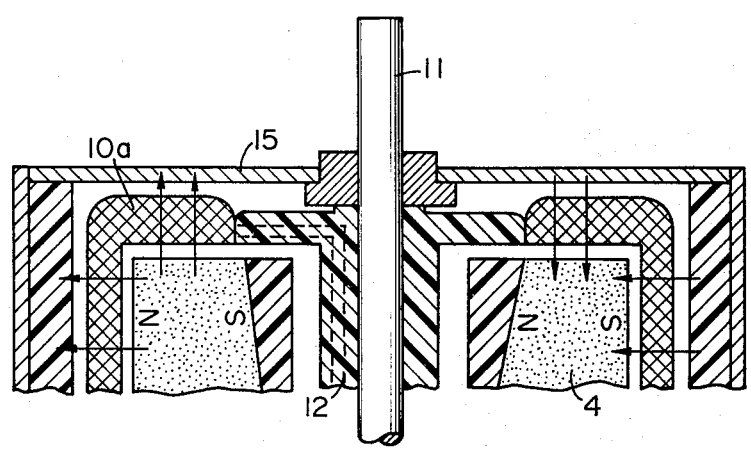
FIG. 2C illustrates the manner how the end connection part 10a is effectively used to realize the flattened form according to the invention.

FIG. 2B shows a rotary coil 10 in which every winding is turned back at the open side of the coil. It is assumed that the coil be further flattened from l/D to l'/D as illustrated in FIG. 2B. In this case the inclination of winding will change from $\theta$ to $\theta'$ by reducing the axial length of the coil from l to l'. As a result, the space available for windings is rendered smaller. The area l" is out of the magnetic path generated from the magnet 4. Therefore, this area l" can not contribute to the output of the motor but makes a contribution to obtaining the larger inclination angle $\theta$ for winding. This is important for the present invention because the winding inclination $\theta$ is made smaller and then the motor efficiency is reduced when the axial length of the coil 10 is reduced from l to l" for the purpose of further flattening of the coil. To solve the problem, as already illustrated by FIG. 1 embodiment, according to the present invention the brush 7 and commutator 12 are disposed not on the side of end connection part 10a of the coil 10 but on the opposite side, namely the open side of the rotary coil 10 and they are located at the area corresponding to the area l" shown in FIG. 2B. By this arrangement it was made possible to reduce the distance between the field magnet 4 and cover member 15 and to increase the motor efficiency while arranging the end connection part 10a in the possible nearest position to the cover member 15.

In the prior art arrangement, in contrast with the above arrangement of the invention, the commutator is disposed on the outer side, that is, the side opposite to the open side of the rotary coil and a brush structure in contact with the commutator takes the place which, in the arrangement of the present invention, the end connection part 10a of the coil will take. Therefore, no magnetic circuit including the cover member 15 was formed and it was impossible to make an effective use of the end connection part of the coil for generating torque in the arrangement according to the prior art. In contrast, according to the invention, the commutator part is located on the open side of the rotary coil and therefore, as seen best in FIG. 2C, between the magnet 4 and cover member 15 on the side of end connection part there exists no other member than the rotary coil. Thus, a magnetic path is formed by the axially extending surface 4b of the magnet 4, end connection part 10a and cover member 15 and the magnetic path can be effectively used to generate torque.

In this manner, a further flattening of rotary electric machine is attained by making full use of the open part of a coreless rotary coil in accordance with the invention. As previously described in detail, the shown embodiment has a commutator disposed on the open side of the coreless rotary coil 10, that is, on the side opposite to the end connection part 10a of the coil. Within the open side part of the coil there is disposed a brush holding member extending vertically in parallel to the commutator and the rotary shaft. This arrangement enables to flatten the form of a rotary electric machine as a whole. Furthermore, the magnet holding member 3 for field magnet 4 is so shaped as to have an inner disc surface 3a, outer disc surface 3b and stepped portion 3c. The brush holding member 6 is received in a space defined by the inner disc surface 3a and stepped portion 3c. The inner disc surface 3a applies a pressure on the flange 6b of the holding member 6 to substantially fix the latter to the motor casing 1. On the other hand, the magnet holding member 3 is pressed and fixed to the motor casing by the ring yoke member 9 which is in turn pressed and fixed by the cover member 15. This permits an easy assembling of the rotary electric machine according to the invention. More particulary, the coreless motor according to the invention can be assembled in a simple manner by sequentially placing one component on another component in the order of motor casing 1—bearing 2—brush holder 6—magnet holder 3—yoke 9—rotor unit B—cover member 15 from the direction of arrow A. Therefore, an automatic assembling system can be used while feeding the above components sequentially in the order.

Figure 3:
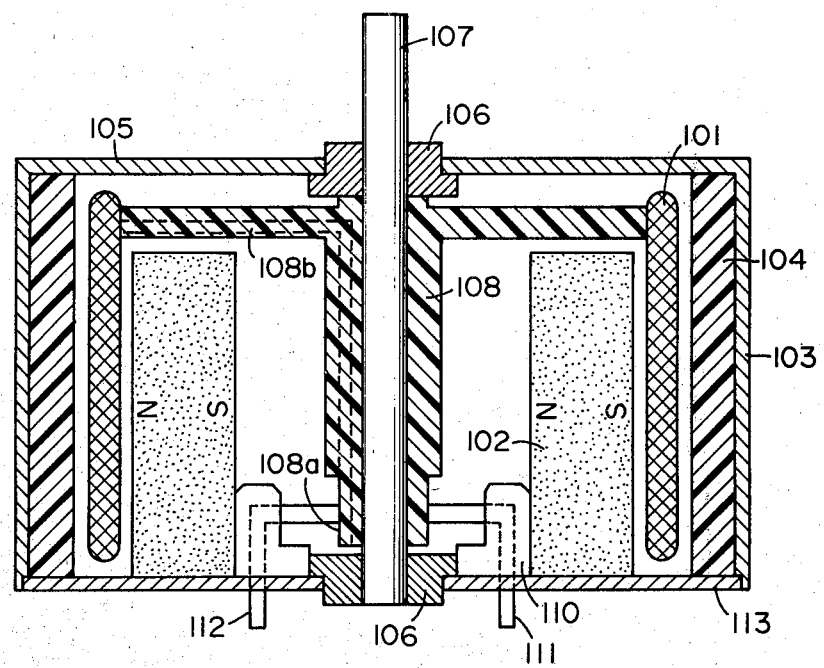
FIG. 3 is an axial sectional view of another embodiment of the invention.

FIG. 3 shows another embodiment of the invention. A field magnet is designated by 102 and a rotor coil by 101. According to the second embodiment, the field magnet 102 can be designed to have a sufficiently large size enough to make the magnetic flux fully interlinked with the inner cylindrical surface of the coil in the longitudinal direction. Therefore, the amount of torque generated by the cylinder part can be increased as compared with the first embodiment shown in FIG. 1. However, for the second embodiment, it is required to enlarge the outer diameter of the rotary electric machine a little as compared with the first embodiment. Otherwise, the space available for locating the commutator part will become too small. The rotor coil shown in FIG. 3 is a conventional cylindrical coil which is open at its both ends. However, like the first embodiment, a coreless coil having an end connection part at only one side may be used also for this second embodiment. When a cylindrical coil with the both ends open is used as shown in FIG. 3, the coil 101 and rotary shaft 107 are supported by a supporting member 108 having a flange portion 108b which connects the inner surface of the coil with the shaft. In this embodiment there is no coil on the flange portion 108b and therefore interlinkage of the magnetic flux becomes unnecessary at this portion. For this reason, the upper surface part 105 of the machine casing can be made of non-magnetic material. Other parts of the structure shown in FIG. 3 correspond to those of FIG. 1 embodiment and need not be further described. The corresponding parts are designated by using the same reference numerals with the addition of 100.

As will be understood from the foregoing, a substantial reduction of the axial length of rotary electric machine is attained by disposing the commutator part within a cup-shaped coil and an improved flat type of rotary electric machine is provided in accordance with the present invention. Moreover, a substantial increase of torque generation is attained by making the magnetic flux interlinked also with the end connection part of the coil in accordance with the present invention. The present invention is advantageously applicable to a miniature DC rotary electric machine such as a micromotor to form a rotary electric machine of flat type and high efficiency which is much more suitable for incorporating into various apparatus and instruments. It is evident that the present invention has many and large effects.

While the invention has been particularly shown and described with reference to preferred embodiments thereof, it will be understood by those skilled in the art that the foregoing and other changes in form and details can be made therein without departing from the spirit and scope of the invention.

What I claim is:

1. A coreless motor structure suitable for contributing to improve a motor of flat type using a cup-shaped rotary coil having one open end and another closed end in accordance with an arrangement of a commutator, a brush and said rotary coil, and an electric connection between said commutator and coil, comprising:
(a) a coreless rotary coil including
   a first inclined coil part formed by winding a wire conductor for a rotary coil of said coreless motor in such manner that, to form a coil body in a shape of cup with one open end and another closed end constituted of an end connection part being a portion of said rotary coil, a winding extends obliquely from one point on one edge of a cylindrical circumferential surface of said coil body to another edge thereof at a predetermined inclination relative to a generatrix of said coil body,
   a second inclined coil part formed by winding said wire conductor in such manner that said winding is turned back at a position in the vicinity of said open end and extends obliquely toward an edge nearly opposed to said one edge of said cylindrical circumferential surface of said coil body, and
   an end connection part for making a connection of said inclined coil parts across the area of the end surface of said cup-shaped body, and formed by winding said inclined coil parts and an end connection part a plural number of times at the same position in layer with the same number of turns so as to form said cup-shaped rotary coil, said end connection part being connected to a rotary shaft;
(b) magnet means constituting a stator of said coreless motor, said magnet means disposed within said rotary coil on the side of the closed end thereof in such manner that the length of said rotary coil in the axial direction of said rotary shaft is long enough relative to that of said magnet means to define an open space between said magnet means and the open end of said rotary coil;

(c) said commutator being fixed integrally with said rotary shaft and disposed within said rotary coil; and (d) said commutator and said brush being disposed within said open space in such manner that said brush extends in parallel with said commutator in the direction normal to said rotary shaft.

2. A coreless motor structure as claimed in claim 1 which is further characterized in that:

(a) said commutator and rotary coil are fixed integrally with said rotary shaft by resin material and are kept conductive by a conductor embedded in said resin material and (b) said open space being formed by a stepped portion of a holding member mounted in a motor casing for holding said field magnet in said coreless motor structure.

3. A coreless rotary electric machine comprising:

(i) a rotor unit comprising:

a cup shaped coreless rotary coil having an open end and having coil portions inclined by a determined angle and positioned about the periphery of the coil and an end connection part positioned solely on one lateral end of said inclined coil portions for connecting successive coil portions; and a commutator disposed within the open end of said coil and being in electrical communication with said coil, said rotary coil and commutator being fixed to a rotary shaft of said rotary electric machine by resin material for rotation together with said rotary shaft;

(ii) a stator unit which forms, together with said rotor unit, said coreless rotary electric machine, said stator unit comprising:

(a) a cylindrical motor casing made of magnetic material and capable of holding, at its one end, a bearing for supporting said rotary shaft;

(b) a yoke member inserted into said motor casing along the inner circumference of said casing;

(c) a magnet holding member for holding a field magnet in position within said coil and having an inner disc surface for supporting thereon said field magnet, an outer disc surface with which said holding member is mounted within said motor casing and an intermediate stepped portion connecting said inner and outer disc surfaces;

(d) a holding member for holding a brush in contact with said commutator, said holding member being disposed in a space formed by said inner disc surface and stepped portion of said magnet holding member; and (iii) a cover member for holding said rotor unit within said stator unit and at a predetermined axial position thereof, said cover member being made of magnetic material so as to form together with the end connection part of said rotary coil a magnetic path.

4. A coreless rotary electric machine as claimed in claim 1, wherein said field magnet and holding member are joined together by resin material through an axial extention of said magnet holding member extending along the inner circumferential surface.

* * * * *